(12) United States Patent
Parageaud

(10) Patent No.: US 11,150,258 B2
(45) Date of Patent: Oct. 19, 2021

(54) AUTOMATIC ANALYZING SYSTEM FOR IN VITRO DIAGNOSTICS

(71) Applicant: ARTEION, Paris (FR)

(72) Inventor: Bertrand Parageaud, Avrillé (FR)

(73) Assignee: ARTEION, Paris (FR)

( * ) Notice: Subject to any disclaimer, the term of this patent is extended or adjusted under 35 U.S.C. 154(b) by 443 days.

(21) Appl. No.: 16/081,317

(22) PCT Filed: Feb. 28, 2017

(86) PCT No.: PCT/FR2017/050440
§ 371 (c)(1),
(2) Date: Aug. 30, 2018

(87) PCT Pub. No.: WO2017/149234
PCT Pub. Date: Sep. 8, 2017

(65) Prior Publication Data
US 2019/0064194 A1   Feb. 28, 2019

(30) Foreign Application Priority Data
Mar. 1, 2016 (FR) .................................... 16/51736

(51) Int. Cl.
*G01N 35/04* (2006.01)
*G01N 35/00* (2006.01)
(Continued)

(52) U.S. Cl.
CPC .............. *G01N 35/04* (2013.01); *B01L 3/565* (2013.01); *B01L 9/06* (2013.01); *B25J 9/0096* (2013.01);
(Continued)

(58) Field of Classification Search
CPC ....... B01L 2300/044; B01L 2300/0609; B01L 3/565; B01L 9/06; B25J 9/0096;
(Continued)

(56) References Cited

U.S. PATENT DOCUMENTS 3,270,202 A   8/1966   Long et al.
3,722,719 A   3/1973   Frank
(Continued)

FOREIGN PATENT DOCUMENTS

| CN | 101162235 A | 4/2008 |
| CN | 105992953 A | 10/2016 |
| JP | 2011137640 A | 7/2011 |

OTHER PUBLICATIONS

International Search Report for Application No. PCT/FR2017/050440.
(Continued)

*Primary Examiner* — Benjamin R Whatley
(74) *Attorney, Agent, or Firm* — Cantor Colburn LLP

(57) ABSTRACT

The automatic analysis system comprise a storage device configured to store a plurality of reaction cuvettes intended to contain biological liquids samples to analyze; at least one samples processing station, comprising at least one receiving cavity which is downwardly open and configured to receive and house at least partially one reaction cuvette; and a displacement device configured to displace a reaction cuvette, the displacement device being further configured to unload a reaction cuvette out of the storage device and to load and unload a reaction cuvette into and out of the at least one receiving cavity of the at least one samples processing station via the respective introduction opening.

16 Claims, 8 Drawing Sheets

(51) Int. Cl.
*B25J 9/02* (2006.01)
*B25J 9/00* (2006.01)
*B01L 3/00* (2006.01)
*B01L 9/06* (2006.01)

(52) U.S. Cl.
CPC .......... *B25J 9/023* (2013.01); *G01N 35/0099* (2013.01); *B01L 2300/044* (2013.01); *B01L 2300/0609* (2013.01); *G01N 2035/041* (2013.01); *G01N 2035/0406* (2013.01); *G01N 2035/0465* (2013.01)

(58) Field of Classification Search
CPC .............. B25J 9/023; G01N 2035/0406; G01N 2035/041; G01N 2035/0465; G01N 35/0099; G01N 35/04
See application file for complete search history.

(56) References Cited

U.S. PATENT DOCUMENTS

| | | | |
|---|---|---|---|
| 3,855,473 A | 12/1974 | Burgess et al. | |
| 3,859,528 A | 1/1975 | Luitwieler et al. | |
| 4,928,453 A | 5/1990 | Ferkany et al. | |
| 5,762,872 A | 6/1998 | Buehler et al. | |
| 8,007,722 B2 | 8/2011 | Mototsu et al. | |
| 8,292,564 B2 | 10/2012 | Nishii et al. | |
| 9,903,965 B2 | 2/2018 | Hanaya et al. | |
| 2008/0085215 A1 | 4/2008 | Mototsu et al. | |
| 2011/0158777 A1 | 6/2011 | Nishii et al. | |
| 2014/0178169 A1* | 6/2014 | Hebert | B01L 9/52 414/752.1 |
| 2015/0104351 A1* | 4/2015 | Makino | G01N 35/0092 422/64 |
| 2015/0160249 A1* | 6/2015 | Bucher | B65G 47/82 422/65 |
| 2016/0266160 A1* | 9/2016 | Hanaya | B01L 9/06 |

OTHER PUBLICATIONS

English Translation to JP Written Opinion for Applicatoin No. 2018-545984; dated Mar. 10, 2021.
English Translation to Written Opinion for Application No. PCT/FR2017/050440.
JP Search Report for Applicatoin No. 2018-545984.
JP Written Opinion for Applicatoin No. 2018-545984; dated Mar. 10, 2021.
Written Opinion for Application No. PCT/FR2017/050440.
English Translation to JP Search Report for Applicatoin No. 2018-545984.

* cited by examiner

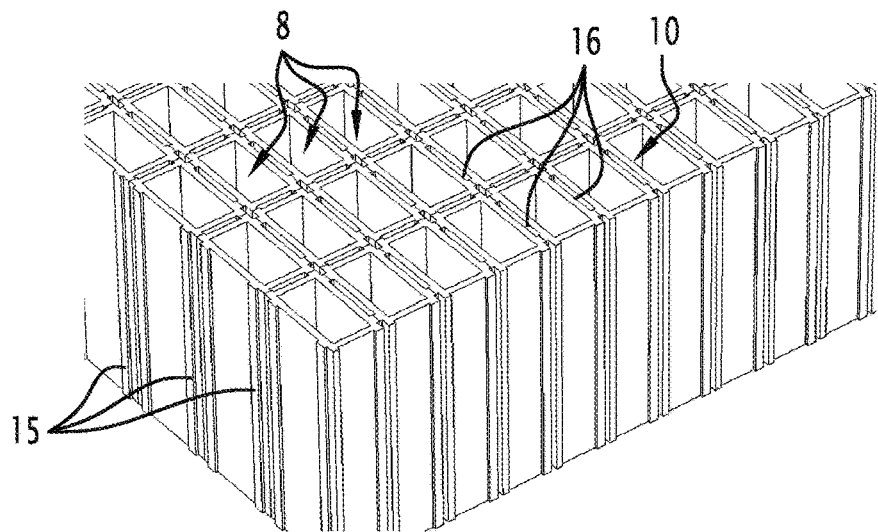
Fig. 3
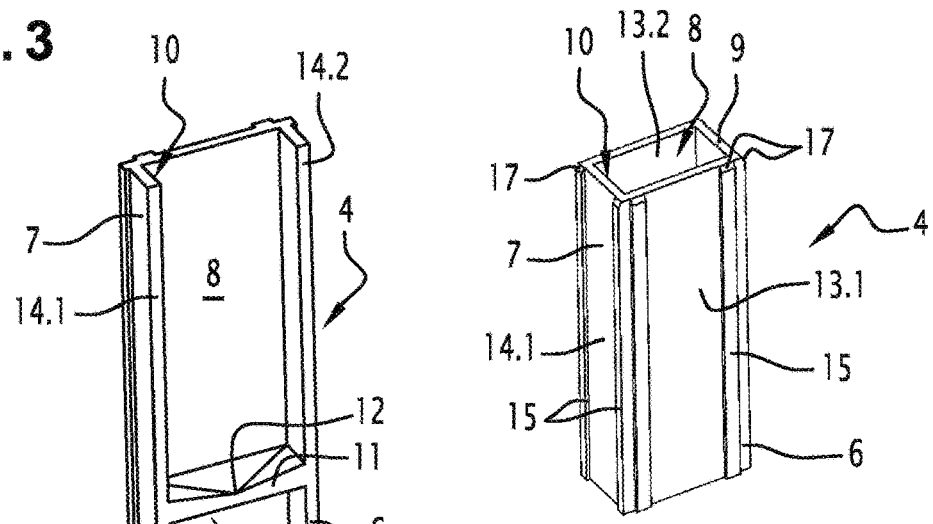
Fig. 4
Fig. 5
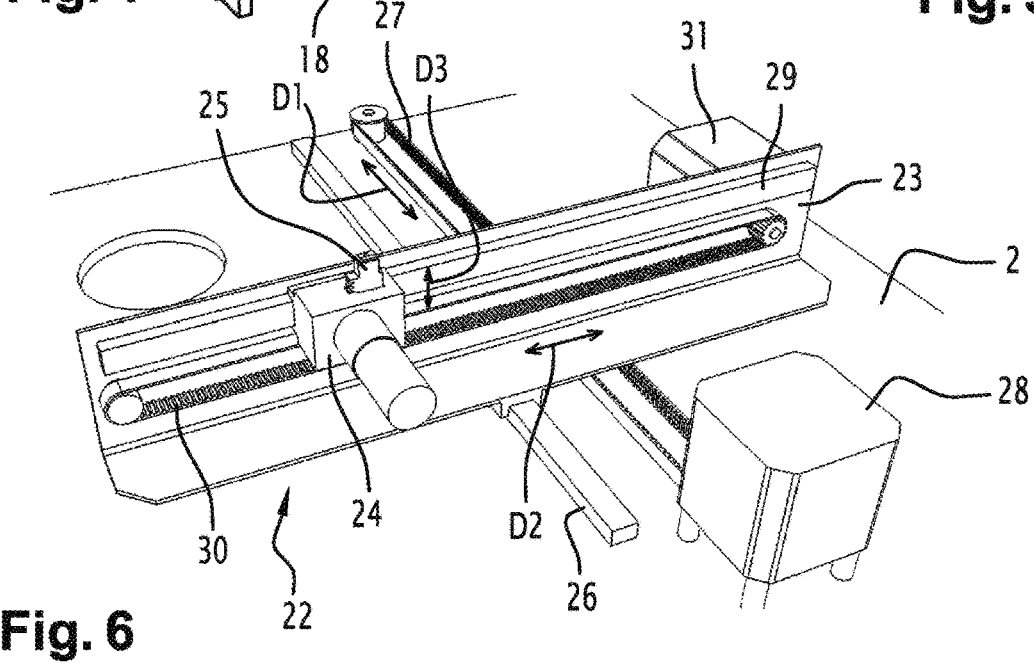
Fig. 6

AUTOMATIC ANALYZING SYSTEM FOR IN VITRO DIAGNOSTICS

CROSS REFERENCE TO RELATED APPLICATIONS

This application is a National Stage of PCT Application No. PCT/FR2017/050440 filed on Feb. 28, 2017, which claims priority to French Patent Application No. 16/51736 filed on Mar. 1, 2016, the contents each of which are incorporated herein by reference thereto.

TECHNICAL FIELD

The present invention concerns an automatic analysis system for in vitro diagnostics.

BACKGROUND

In a known manner, an automatic analysis system for in vitro diagnostics comprises:
- a storage device configured to store a plurality of reaction cuvettes intended to contain biological liquids samples to analyze,
- a plurality of samples processing stations intended to receive reaction cuvettes in order to carry out treatments of the biological liquids samples contained in the reaction cuvettes, such as dilutions, extractions and/or measurements for example optical measurements,
- one or several collection and pipetting device(s) arranged to supply the reaction cuvettes with biological liquid samples and/or with reagent products, and
- a gripping device configured to grasp and transport a reaction cuvette at different points of the automatic analysis system, and in particular between the storage device and the different samples processing stations, and between the different samples processing stations.

In particular, such a gripping device comprises a gripping head movably mounted vertically. More particularly, the gripping head is configured to be positioned above a reaction cuvette, and to firmly grasp an upper portion of the reaction cuvette, in order to be able to displace it.

In order to reduce the risks of interferences between the gripping device and the collection and pipetting devices, it is known to enlarge either the length of the support body supporting the gripping head, or the length of the pipetting arms of the collection and pipetting devices. However, such an enlargement of the support body or of the pipetting arms affects the compactness and the reliability of the automatic analysis system.

BRIEF SUMMARY

The present invention aims at overcoming these drawbacks.

Hence, the technical problem at the origin of the invention consists in providing an automatic analysis system for in vitro diagnostics which has a simple and compact structure, while ensuring an optimum reliability of the measurements performed using such an automatic analysis system.

To this end, the present invention concerns an automatic analysis system for in vitro diagnostics, comprising:
- a storage device configured to store a plurality of reaction cuvettes each comprising a base and intended to contain biological liquids samples to analyze,
  - at least one samples processing station comprising at least one receiving cavity configured to receive and house at least partially one reaction cuvette, the at least one receiving cavity comprising a lower introduction opening which opens downward and is configured to enable the introduction of a reaction cuvette into the at least one receiving cavity, and
- a displacement device configured to displace a reaction cuvette, the displacement device being further configured to unload a reaction cuvette out of the storage device and to load and unload a reaction cuvette into and out of the at least one receiving cavity of the at least one samples processing station via the respective introduction opening,
- the displacement device comprising:
  - a first support element movably mounted according to a substantially horizontal first direction of displacement,
  - a second support element movably mounted on the first support element according to a substantially horizontal second direction of displacement substantially orthogonal to the first direction of displacement, and
  - a drive member movably mounted on the second support element according to a substantially vertical third direction of displacement, the drive member being configured to cooperate with the base of a reaction cuvette and to transmit a drive movement to said reaction cuvette.

Such a configuration of the displacement device and of the at least one samples processing station allows handling the reaction cuvettes by the bottom, and therefore avoiding any risk of interference between the displacement device and collection and pipetting devices belonging to the automatic analysis system. These arrangements allow considerably improving the reliability and the simplicity of the automatic analysis system.

Such a configuration of the displacement device and of the at least one samples processing station also allows improving the compactness of the automatic analysis system, and displacing the reaction cuvettes rapidly and accurately at different points of the analysis system.

Furthermore, the configuration of the automatic analysis system according to the present invention allows implementing incubation areas and measurement areas which are separate, and therefore at different temperatures.

In addition, such a configuration of the displacement device and of the at least one samples processing station allows limiting the risks of contamination of the reaction cuvettes during their displacements.

The automatic analysis system may further present one or more of the following features, considered separately or in combination.

According to an embodiment of the invention, the at least one samples processing station consists of an analysis and/or measurement station for in vitro diagnostics, and more particularly for carrying out blood tests, such as whole-blood tests.

According to an embodiment of the invention, the displacement device is disposed under the at least one samples processing station.

According to an embodiment of the invention, the displacement device is configured to displace a reaction cuvette according to Cartesian displacements.

According to an embodiment of the invention, the drive member is configured to support a reaction cuvette.

According to an embodiment of the invention, the base of each reaction cuvette comprises a receiving housing opening downward, the drive member being configured to be received at least partially in the receiving housing of a reaction cuvette.

According to an embodiment of the invention, the displacement device comprises first translational drive means configured to drive the first support element in translation according to the first direction of displacement, second translational drive means configured to drive the second support element in translation according to the second direction of displacement, and third translational drive means configured to drive the drive member in translation according to the third direction of displacement.

According to an embodiment of the invention, the automatic analysis system comprises a plurality of samples processing stations each comprising at least one receiving cavity.

According to an embodiment of the invention, the displacement device comprises suction means configured to retain a reaction cuvette on the drive member during the displacements of said reaction cuvette.

According to an embodiment of the invention, the suction means includes a suction orifice provided on the drive member and intended to be connected to a vacuum source.

According to an embodiment of the invention, each receiving cavity comprises at least one retaining element configured to retain a reaction cuvette received in said receiving cavity.

According to an embodiment of the invention, the at least one retaining element is configured to cooperate by friction with a lateral wall of a reaction cuvette received in the respective receiving cavity.

According to an embodiment of the invention, the reaction cuvettes intended to be stored in the storage device are connected to each other by a flexible sealing film so as to form a reaction cuvettes plate, the reaction cuvettes of said plate being disposed in a matrix-like fashion, the flexible sealing film sealing openings of said reaction cuvettes. The presence of such a flexible sealing film allows on the one hand facilitating the handling of the reaction cuvettes before their loading into the storage device, and on the other hand, considerably reducing the evaporations of the liquids contained in the reaction cuvettes and the risks of contaminations of the reaction cuvettes and of their content.

According to an embodiment of the invention, the reaction cuvettes of said plate are juxtaposed.

According to an embodiment of the invention, the flexible sealing film comprises a plurality of score lines delimiting a plurality of sealing portions, each sealing portion sealing the opening of a respective reaction cuvette.

According to an embodiment of the invention, the flexible sealing film comprises a first series of score lines extending between rows of reaction cuvettes and a second series of score lines extending between columns of reaction cuvettes. Advantageously, the score lines of the first series extend substantially orthogonally to the score lines of the second series.

According to an embodiment of the invention, the displacement device is configured to lift up a reaction cuvette stored in the storage device so as to break up the score lines delimiting the respective sealing portion.

According to an embodiment of the invention, the storage device comprises a stop member comprising a passage hole, the storage device being configured such that, during the lifting of a reaction cuvette stored in the storage device by the displacement device, the stop member holds in position the reaction cuvettes adjacent to the lifted reaction cuvette and the passage hole enables the passage of at least one portion of the lifted reaction cuvette.

According to an embodiment of the invention, each reaction cuvette comprises, on each of its lateral walls, at least one positioning rib configured to cooperate with an adjacent reaction cuvette, so as to form at least one space between the openings of two adjacent reaction cuvettes. The positioning ribs are further configured to protect the optical surfaces of the reaction cuvettes before and after the assembly of said reaction cuvettes.

According to an embodiment of the invention, each positioning rib is configured to cooperate with a positioning rib of an adjacent reaction cuvette, so as to form the respective at least one space.

According to an embodiment of the invention, the positioning ribs of each reaction cuvette are substantially parallel.

According to an embodiment of the invention, the at least one positioning rib provided on each lateral wall of a reaction cuvette is shifted laterally relative to the at least one positioning rib provided on the lateral wall opposite to said reaction cuvette. These arrangements allow facilitating the positioning of the reaction cuvettes in lines and rows, while allowing automatic spotting of a defect in the positioning of a reaction cuvette, for example in a vibratory bowl.

According to an embodiment of the invention, each positioning rib extends over at least part of the height, and for example over substantially the entire height, of the respective reaction cuvette.

According to an embodiment of the invention, the flexible sealing film is fastened on the upper edges of the reaction cuvettes. For example, such a fastening may be achieved by bonding, welding or heat-sealing.

According to an embodiment of the invention, the automatic analysis system comprises an incubation device comprising a plurality of incubation cavities each configured to receive and house at least partially one reaction cuvette, each incubation cavity comprising a lower introduction opening which opens downward and is configured to enable the introduction of a reaction cuvette into the respective incubation cavity, the displacement device being configured to load and unload a reaction cuvette into and out of each incubation cavity via the respective introduction opening. In particular, the presence of a plurality of incubation cavities allows setting reaction cuvettes received in the incubation device at different temperature values.

According to an embodiment of the invention, the incubation device comprises a plurality of upper passage orifices each opening into a respective incubation cavity, each upper passage orifice being intended to the passage of a collection needle capable of supplying each reaction cuvette received in the incubation device with biological liquid samples to analyze and/or with reagent products.

According to an embodiment of the invention, the incubation device comprises an immobilization element movably mounted between an introduction position in which reaction cuvettes can be loaded and unloaded into and out of the incubation cavities, and an immobilization position in which the immobilization element prevents a removal of the reaction cuvettes out of the respective incubation cavities. In particular, these arrangements allow avoiding a removal of a reaction cuvette out of the incubation device during the perforation of the respective sealing portion by a collection needle intended to supply the reaction cuvette with a biological liquid sample and/or with reagent products.

According to an embodiment of the invention, the immobilization element is configured to clear the introduction openings of the incubation cavities when it is in the introduction position, and to extend at least partially opposite the introduction openings of the incubation cavities when it is in the immobilization position.

According to an embodiment of the invention, each incubation cavity is configured to completely house a reaction cuvette.

According to an embodiment of the invention, each incubation cavity presents a shape substantially complementary to the reaction cuvettes. These arrangements ensure a wide heat exchange surface between a reaction cuvette received in an incubation cavity and the incubation device, and therefore a better regulation of the temperature of the liquids contained in said reaction cuvette.

According to an embodiment of the invention, the immobilization element includes a plurality of passage openings, each passage opening being configured to extend opposite the introduction opening of a respective incubation cavity when the immobilization element is in the introduction position, and to be shifted laterally relative to the introduction opening of the respective incubation cavity when the immobilization element is in the immobilization position.

According to an embodiment of the invention, the incubation cavities of the incubation device are disposed according to a matrix of rows and columns.

According to an embodiment of the invention, the incubation device is configured to maintain the temperature of each reaction cuvette received in an incubation cavity within a predetermined range of temperatures. Advantageously, the incubation device is thermostated.

Advantageously, each incubation cavity opens into a lower face of the incubation device.

According to an embodiment of the invention, at least one samples processing station comprises a plurality of upper passage orifices each opening into a respective receiving cavity and each intended to the passage of a collection needle.

According to an embodiment of the invention, the automatic analysis system comprises at least one collection device arranged to collect biological liquid samples to analyze and/or reagent products in containers loaded into the automatic analysis system, and to supply the reaction cuvettes with biological liquid samples and/or with reagent products, and for example to supply with biological liquid samples and/or with reagent products the reaction cuvettes received in the incubation device and/or in the at least one samples processing station.

According to an embodiment of the invention, the at least one samples processing station includes at least one device among a photometric reading device, a fluorescence reading device, a luminescence reading device, a cytometric measurement device and a coagulation measurement device. For example, the at least one samples processing station may include several coagulation measurement devices.

According to an embodiment of the invention, the at least one samples processing station includes a photometric reading station comprising a photometric reading device and an incubator including a plurality of receiving cavities each configured to receive and house at least partially one reaction cuvette, the photometric reading device being capable of performing a photometric reading of the reaction cuvettes received in the receiving cavities of the incubator.

According to an embodiment of the invention, the incubator comprises:
- an incubation rotor with a substantially vertical axis of rotation and including the plurality of respective receiving cavities,
- a fixed support portion disposed under the incubation rotor, the fixed support portion delimiting a displacement track in which reaction cuvettes, received in the receiving cavities provided on the incubation rotor, can be displaced by the action of the incubation rotor, the displacement track being annular and open at the top.

According to an embodiment of the invention, the displacement track is temperature-controlled.

According to an embodiment of the invention, the fixed support portion includes a lower loading opening which opens into the displacement track and through which a reaction cuvette can be loaded into the incubator by the displacement device.

According to an embodiment of the invention, the fixed support portion includes a lower unloading opening which opens into the displacement track and through which a reaction cuvette can be unloaded out of the incubator.

According to an embodiment of the invention, the incubator comprises rotational drive means associated to the incubation rotor and arranged to drive the incubation rotor in rotation about its axis of rotation.

According to an embodiment of the invention, the photometric reading device comprises a photometer arranged to perform a photometric reading of the reaction cuvettes received in the displacement track.

According to another embodiment of the invention, the incubator is fixed and the photometric reading device is movably mounted relative to the incubator and is arranged to perform a photometric reading of the reaction cuvettes received in the receiving cavities of the incubator. According to such an embodiment of the invention, the receiving cavities of the incubator are aligned.

According to an embodiment of the invention, the at least one samples processing station includes a washing and magnetic sedimentation station comprising at least one receiving cavity configured to receive and house, at least partially, one reaction cuvette, the at least one receiving cavity of the at least one washing and magnetic sedimentation station comprising a lower introduction opening which opens downward and is configured to enable the introduction of a reaction cuvette into said at least one receiving cavity, the displacement device being configured to load and unload a reaction cuvette into and out of said at least one receiving cavity via the respective introduction opening.

According to an embodiment of the invention, the washing and magnetic sedimentation station comprises at least one pipetting apparatus configured to draw liquids contained in a reaction cuvette received in the at least one receiving cavity of the at least one washing and magnetic sedimentation station, and to introduce a washing solution into said reaction cuvette.

According to an embodiment of the invention, the washing and magnetic sedimentation station comprises at least one magnetic field generator, such as a permanent magnet or an electromagnet.

According to an embodiment of the invention, each reaction cuvette presents at least one plane of symmetry, and may for example present two orthogonal planes of symmetry.

According to an embodiment of the invention, the samples processing stations are disposed around the incubation device.

According to an embodiment of the invention, the at least one samples processing station includes an amplification and measurement station for molecular biology, such as a PCR amplification and measurement station. For example, the PCR amplification and measurement station may comprise a fluorescence or luminescence reading device.

According to an embodiment of the invention, the at least one samples processing station includes an elution station.

BRIEF DESCRIPTION OF THE DRAWINGS

Anyway, the invention will be better understood from the following description with reference to the appended schematic drawing representing, as non-limiting examples, two embodiments of this automatic analysis system.

FIGS. 2 and 3 are partial perspective views of a reaction cuvettes plate with and without a sealing film.

FIG. 4 is a sectional perspective view of a reaction cuvette.

FIG. 5 is a perspective view of a reaction cuvette.

FIG. 6 is a perspective view of a displacement device belonging to the automatic analysis system of FIG. 1.

DETAILED DESCRIPTION

FIGS. 1 to 16 represent an automatic analysis system 2 for in vitro diagnostics according to a first embodiment of the present invention.

The automatic analysis system 1 comprises a support structure 2, a communication and visualization interface (not represented in the figures) mounted on the support structure 2, and embedded electronics (not represented in the figures) also mounted on the support structure 2.

For example, the communication and visualization interface includes a tactile screen connected to a PC-type computer. More particularly, the PC-type computer is arranged to record analysis requests loaded manually by an operator using the tactile screen or originating from a central unit of an analysis laboratory, to send analysis requests to the embedded electronics, to recover measured data, process them thanks to specific algorithms, and make the results available to the operator.

Figure 1:
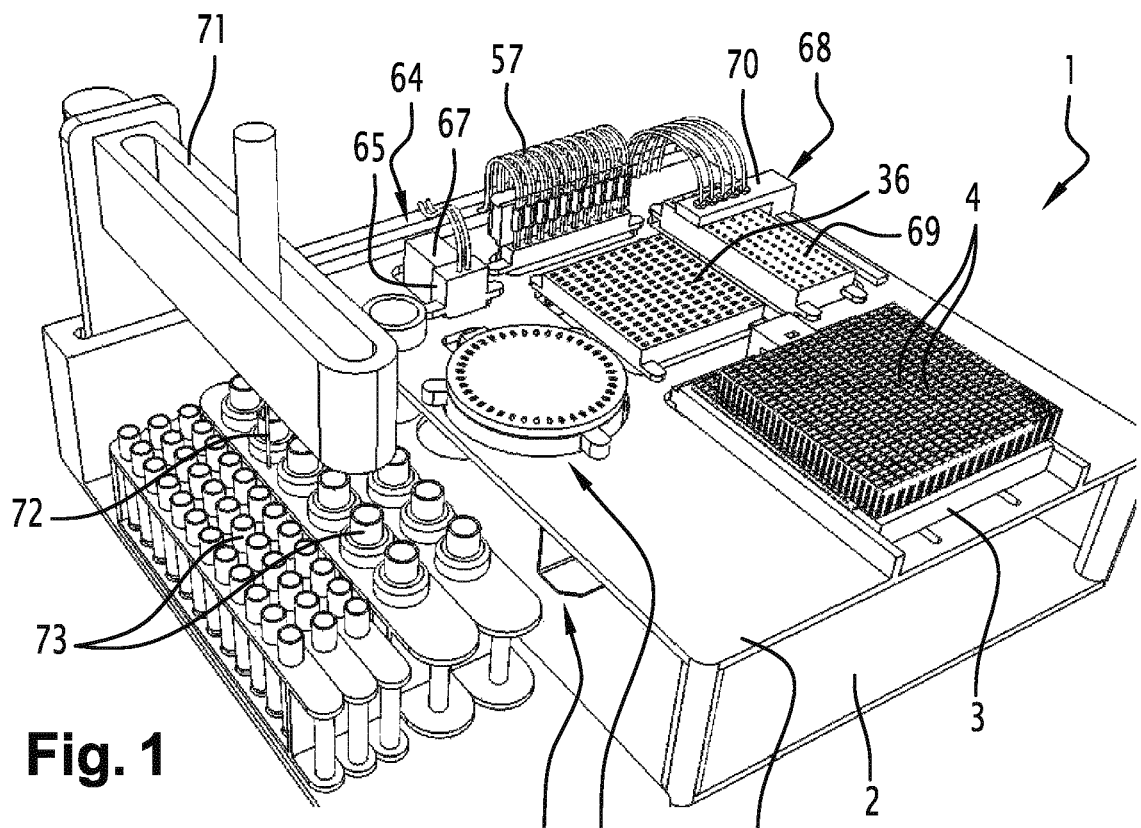
FIG. 1 is a perspective view of an automatic analysis system according to a first embodiment of the invention.
Figure 7:
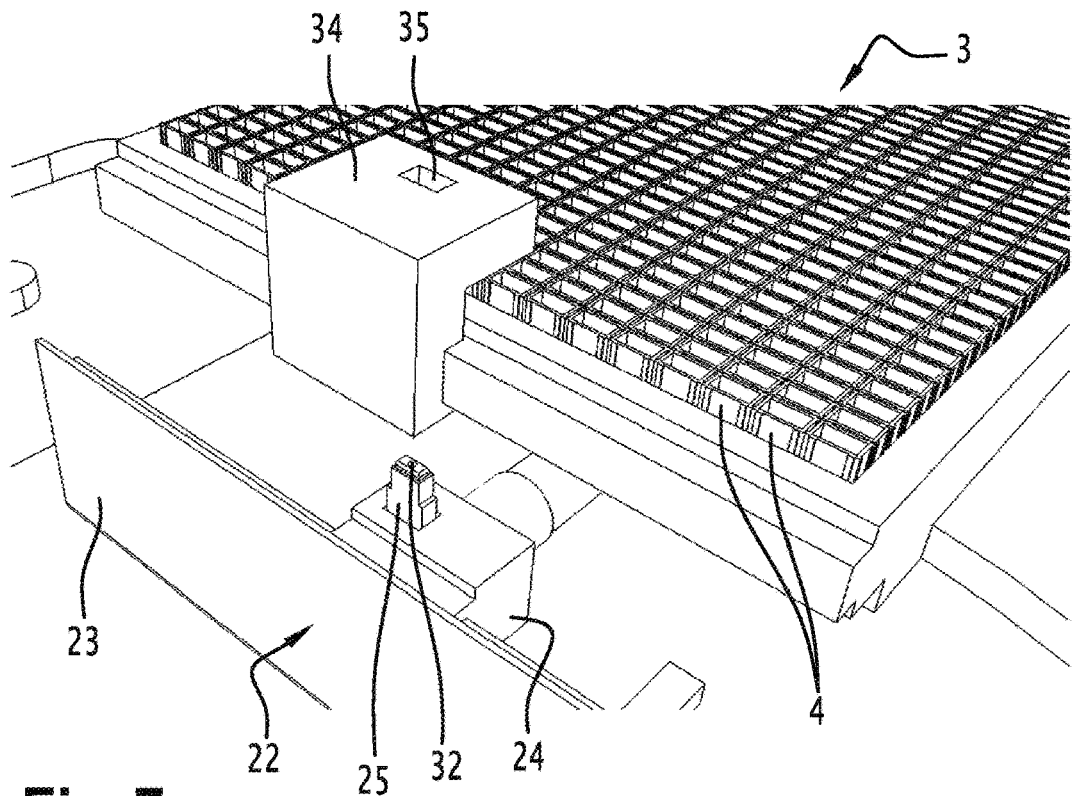
FIGS. 7 and 8 are partial perspective views of the displacement device of FIG. 6 and of a storage device.
Figure 8:
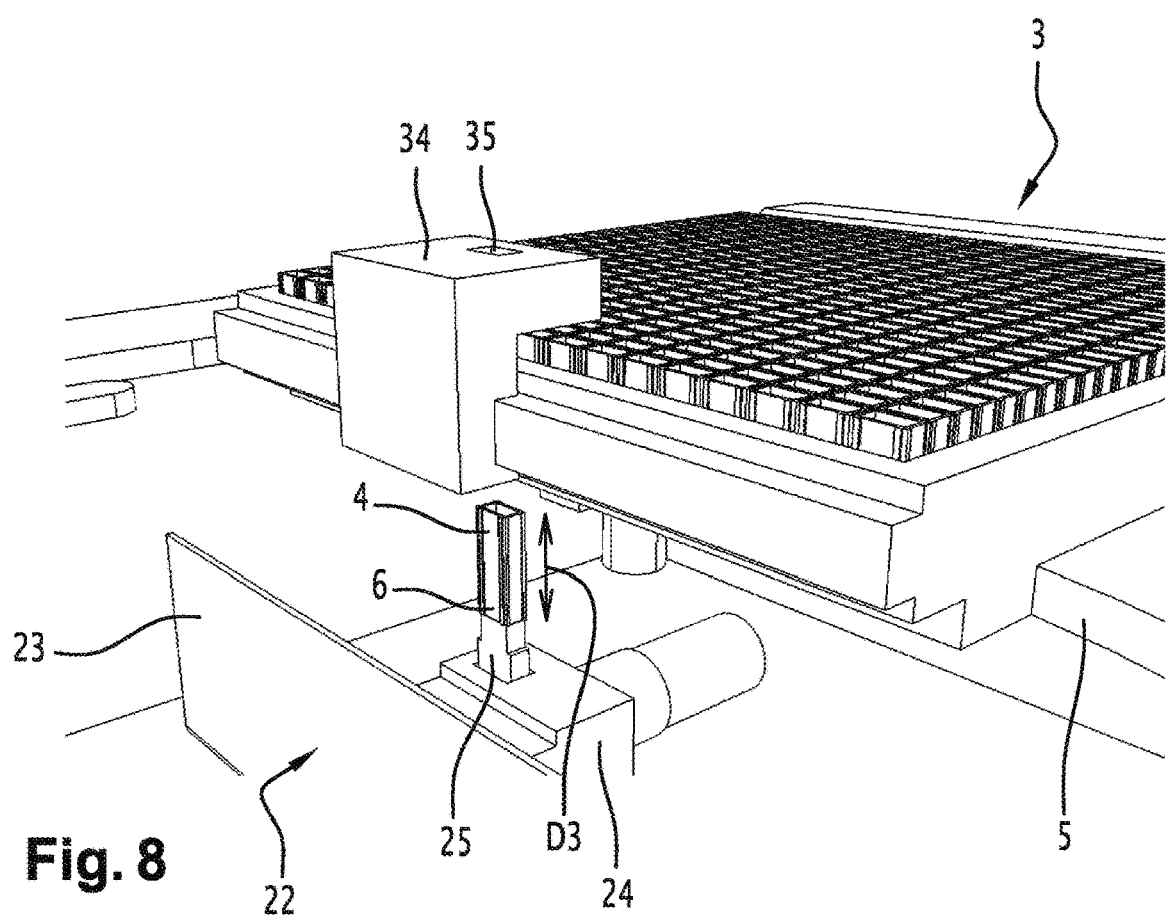
Figure 9:
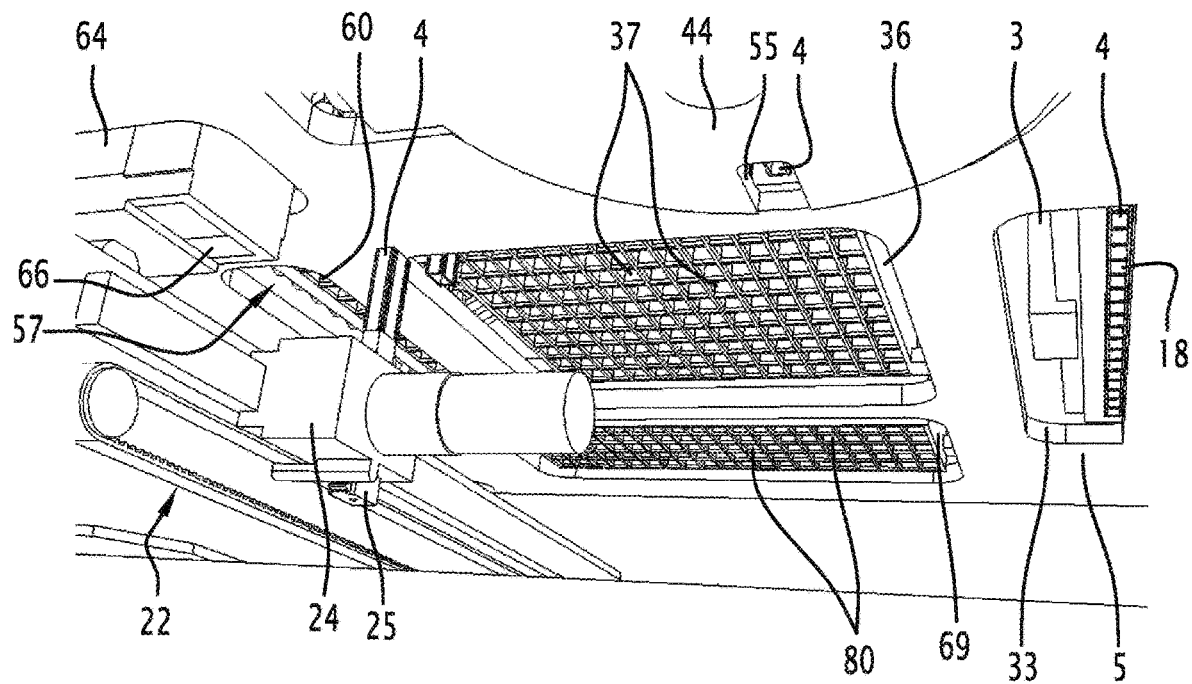
FIG. 9 is a bottom perspective view of the displacement device, of an incubation device and of different processing stations belonging to the automatic analysis system of FIG. 1.
Figure 10:
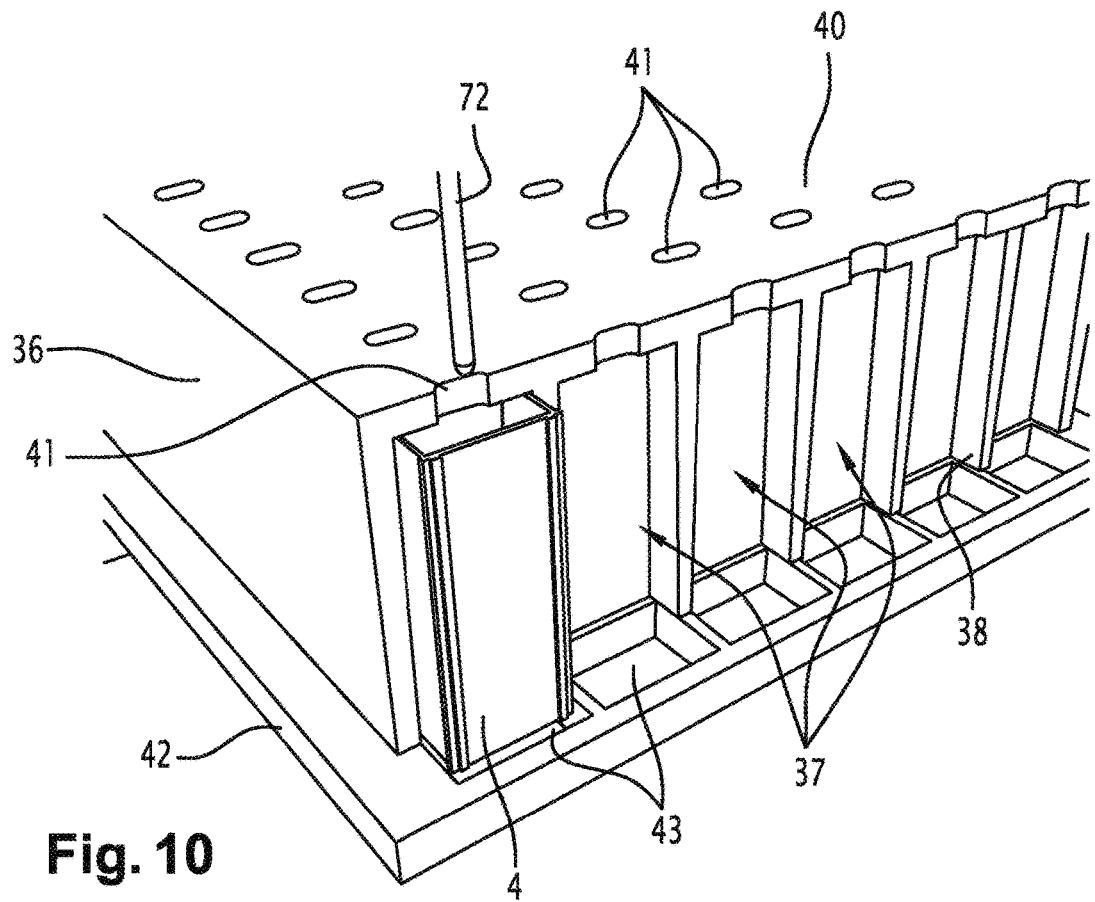
FIGS. 10 and 11 are sectional perspective views of the incubation device in two different operating positions.
Figure 11:
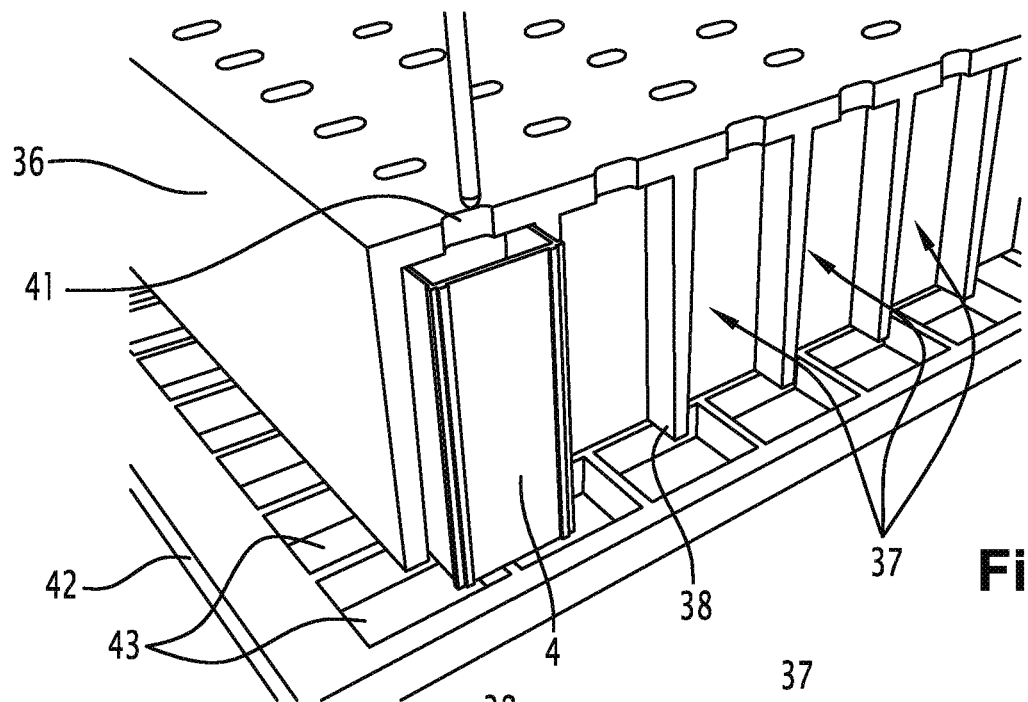
Figure 12:
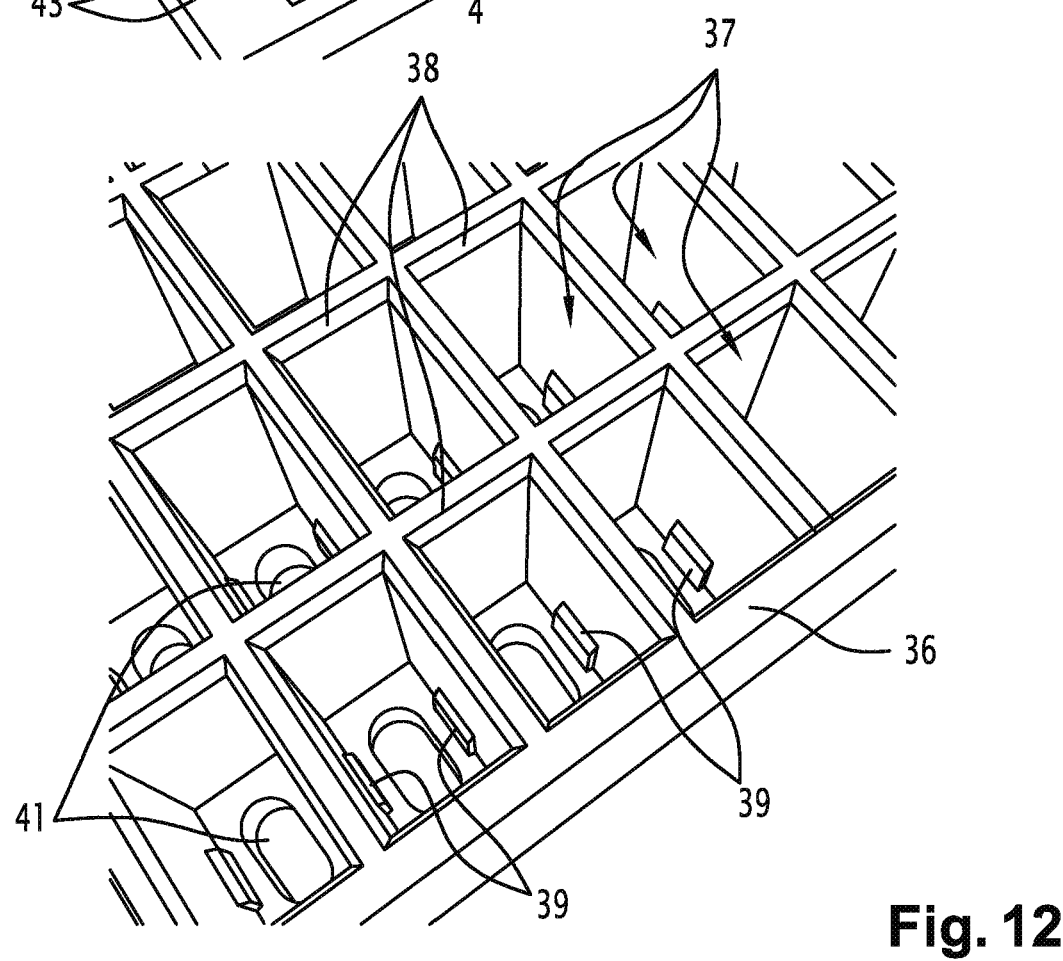
FIG. 12 is a partial bottom perspective view of the incubation device.
Figure 13:
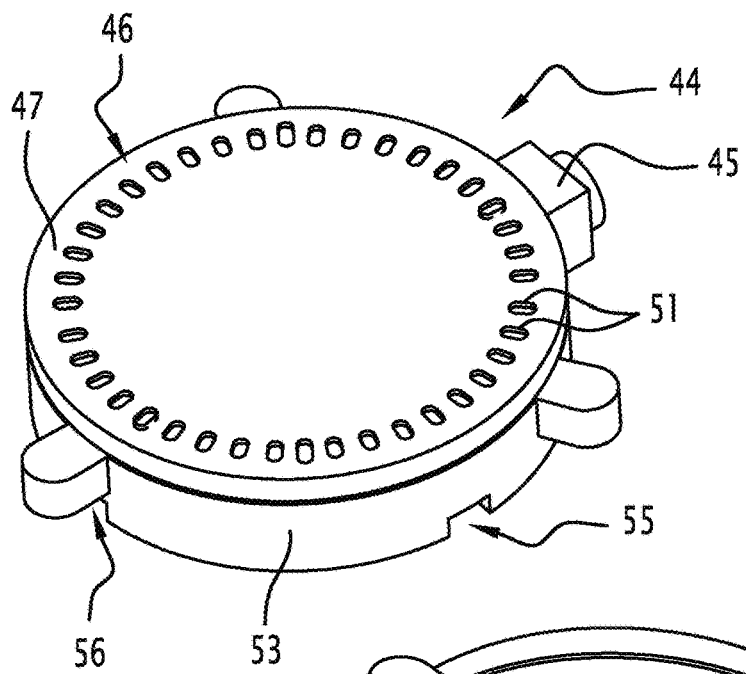
FIGS. 13 and 14 are top and bottom perspective views of a photometric reading station belonging to the automatic analysis system of FIG. 1.
Figure 14:
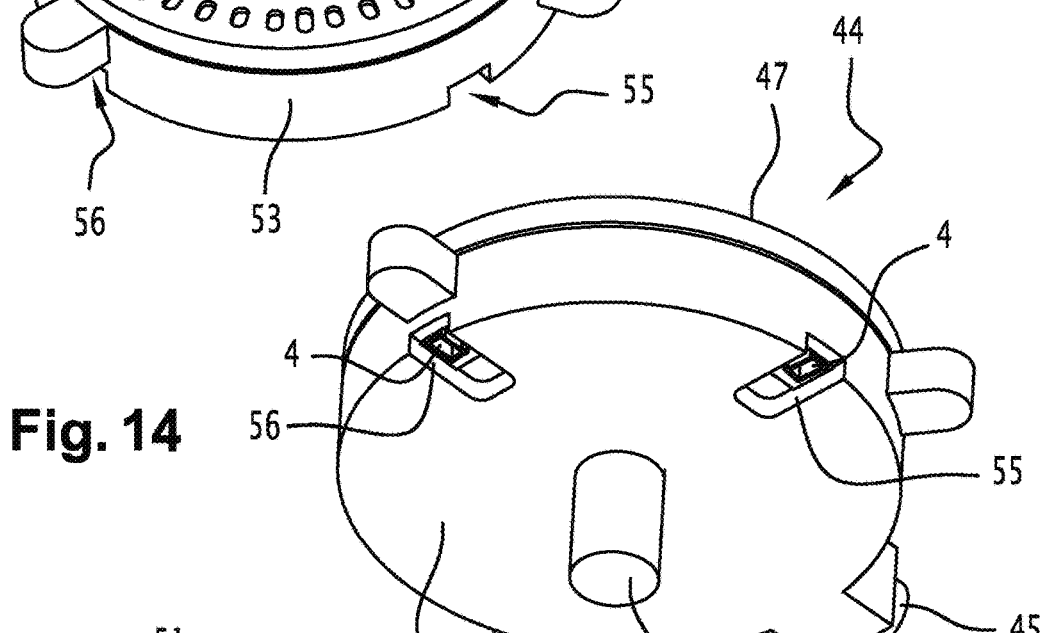
Figure 15:
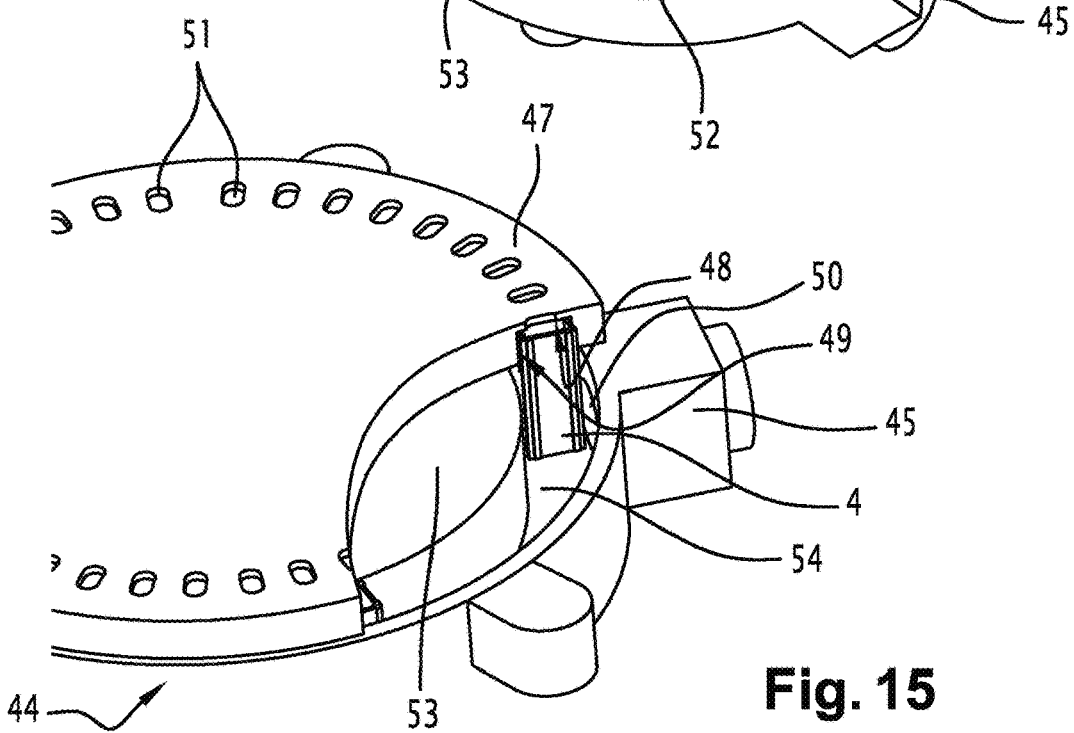
FIG. 15 is a sectional perspective view of the photometric reading station.
Figure 16:
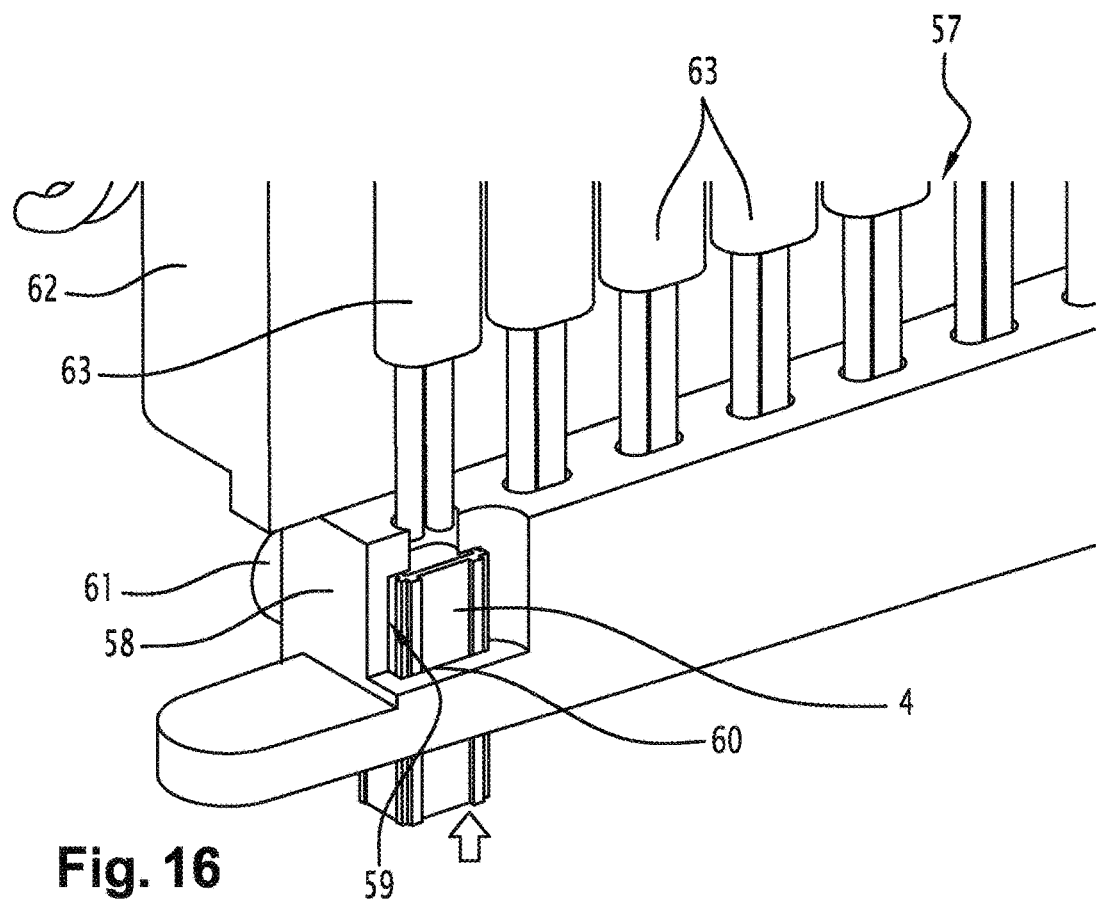
FIG. 16 is a perspective view of a washing and magnetic sedimentation station belonging to the automatic analysis system of FIG. 1.

The automatic analysis system 1 further comprises a storage device 3 configured to store a plurality of reaction cuvettes 4. Advantageously, the storage device 3 is mounted on a support tray 5 shifted vertically relative to the support structure 2. As shown in FIGS. 1, 7 and 8, the reaction cuvettes 4 are advantageously juxtaposed and disposed in a matrix-like fashion in the storage device 3. Advantageously, each reaction cuvette 4 is made of a plastic material transparent to light beams.

As shown more particularly in FIGS. 2 to 5, each reaction cuvette 4 presents a parallelepiped general shape, and comprises a base 6 and an upper portion 7 delimiting a reaction cavity 8 which is open at the top and is intended to contain a biological liquid sample to analyze, such as a blood sample. More particularly, the upper edge 9 of the upper portion 7 of each reaction cuvette 4 delimits a cuvette opening 10 which opens into the respective reaction cavity 8.

Advantageously, the reaction cavity 8 comprises a bottom 11 presenting a low point 12, for example centered with respect to the reaction cavity 8, such that it is possible to easily suck in almost the entirety of the reactive liquid present in the reaction cavity 8, with a much reduced volume remaining in the reaction cuvette 4. For example, the bottom 11 may present a substantially conical shape.

Each reaction cuvette 4 further comprises two longitudinal walls 13.1, 13.2 parallel to each other, and two transverse walls 14.1, 14.2 also parallel to each other. Advantageously, each of the longitudinal walls 13.1, 13.2 and the transverse walls 14.1, 14.2 of each reaction cuvette 4 is provided win one or several positioning rib(s) 15. According to the embodiment represented in the figures, each of the longitudinal and transverse walls is provided with two parallel positioning ribs 15. Advantageously, each positioning rib 15 of a reaction cuvette 4 is configured to cooperate with a positioning rib 15 of an adjacent reaction cuvette 4, so as to form a space 16 between the cuvette openings 10 of two adjacent reaction cuvettes 4 (see FIG. 3). Advantageously, each positioning rib 15 extends over the entirety or substantially the entirety of the height of the respective reaction cuvette, and may present an upper chamfer 17, as shown in FIG. 5.

As shown in FIG. 4, the base 6 of each reaction cuvette 4 comprises a receiving housing 18, also called gripping housing, opening downward and whose function will be set out hereinafter.

Figure 2:
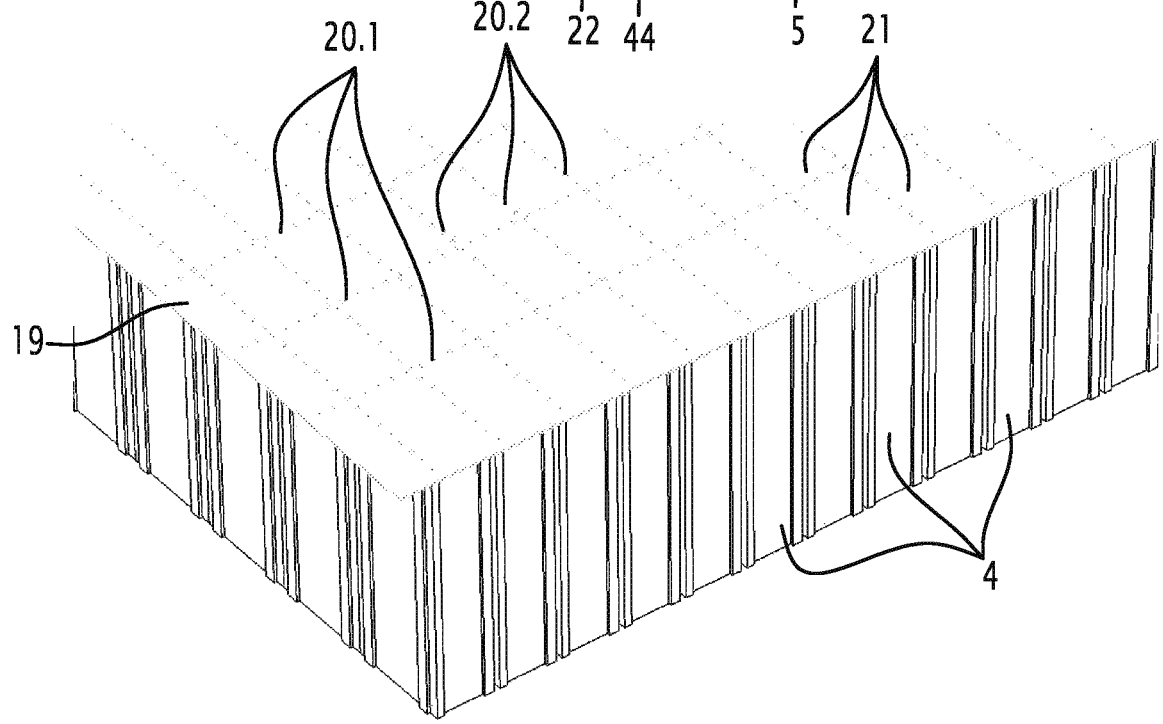

As shown more particularly in FIG. 2, the reaction cuvettes 4 may advantageously be connected to each other by a flexible sealing film 19 sealing the cuvette openings 10 of the reaction cuvettes 4, so as to form a reaction cuvettes plate. Advantageously, the flexible sealing film 19 is made of a synthetic material, and is fastened on the upper edges 9 of the reaction cuvettes 4 for example by thermo-welding.

According to the embodiment represented in the figures, the flexible sealing film 19 comprises a plurality of score lines 20.1, 20.2 delimiting a plurality of sealing portions 21 each sealing the cuvette opening 10 of a respective reaction cuvette 4. Advantageously, the flexible sealing film 19 comprises a first series of score lines 20.1 extending between rows of reaction cuvettes 4, and a second series of score lines 20.2 extending between columns of reaction cuvettes 4. Advantageously, the score lines 20.1 of the first series extend orthogonally to the score lines 20.2 of the second series.

The automatic analysis system 1 also comprises a displacement device 22, shown more particularly in FIGS. 6 to 9, disposed under the support tray 5. The displacement device 22 is configured to displace a reaction cuvette 4 according to Cartesian displacements, and in particular to handle the latter by the bottom.

The displacement device 22 comprises a first support element 23 movably mounted relative to the support structure 2 according to a first direction of displacement D1 which is horizontal, a second support element 24 movably mounted on the first support element 23 according to a second direction of displacement D2 which is horizontal and which is orthogonal to the first direction of displacement D1, and a drive member 25, for example in the form of a drive pin, movably mounted on the second support element 24 according to a third direction of displacement D3 which is vertical and therefore orthogonal to the first and second directions of displacement D1, D2. The drive member 25 is arranged to be introduced into the receiving housing 18 of a reaction cuvette 4, and to transmit a drive movement to said reaction cuvette 4.

Advantageously, the displacement device 22 comprises first translational drive means configured to drive the first support element 23 in translation according to the first direction of displacement D1, second translational drive means configured to drive the second support element 24 in translation according to the second direction of displacement D2, and third translational drive means configured to drive the drive member 25 in translation according to the third direction of displacement D3.

The first translational drive means may comprise for example:
- a guide rail 26 mounted on the support structure 2 and extending horizontally according to the first direction of displacement D1, the first support element 23 being slidably mounted on the guide rail 26,
- an endless belt 27, preferably notched, connected to the first support element 23 and arranged to slidably drive the latter along the guide rail 26, and
- a drive motor 28 whose output shaft is provided with a pinion, preferably notched, arranged to drive the endless belt 27.

The second translational drive means may comprise for example:
- a guide rail 29 mounted on the first support element 23 and extending horizontally according to the second direction of displacement D2, the second support element 24 being slidably mounted on the guide rail 29,
- an endless belt 30, preferably notched, connected to the second support element 24 and arranged to slidably drive the latter along the guide rail 29, and
- a drive motor 31 whose output shaft is provided with a pinion, preferably notched, arranged to drive the endless belt 30.

The third translational drive means may comprise for example a drive motor whose output shaft is provided with a pinion, preferably notched, arranged to cooperate with a rack provided on the drive member 25.

Advantageously, the displacement device 22 further comprises suction means configured to retain a reaction cuvette 4 on the drive member 25 during the displacements of the reaction cuvette. Advantageously, the suction means are configured to generate a vacuum at the end of the drive member 25. For example, the suction means include a suction orifice 32 provided on the end of the drive member 25, and connected to a vacuum source (not represented in the figures). During a displacement of a reaction cuvette 4 by the displacement device 22, the suction orifice 32 is configured to be located opposite the bottom of the receiving housing 18 of said reaction cuvette 4.

As shown more particularly in FIGS. 7 and 8, the drive member 25 can be displaced at least partially under the storage device 3, and the displacement device 22 is adapted to unload a reaction cuvette 4 received in the storage device 3 out of the latter. To this end, the support tray 5 includes a passage aperture 33, shown in FIG. 9, extending along a lateral edge of the storage device 3, and more particularly along an extreme row of reaction cuvettes 4 received in the storage device 3. The passage aperture 33 is shaped so as to enable the passage of the drive member 25 and of a reaction cuvette 4.

In order to unload a reaction cuvette 4 out of the storage device 3, the displacement device 22 is controlled so as to:
- displace the drive member 25 horizontally below the reaction cuvette to unload,
- displace the drive member 25 vertically upward so that the drive member 25 fits into the reaction housing 18 of the reaction cuvette to unload and lifts up the latter so as to break up the score lines 20.1, 20.2 delimiting the respective sealing portion 21,
- activate the vacuum source so that the reaction cuvette 4 lifted up by the drive member 25 is firmly retained by the latter, the retaining force generated by the suction means may be detected using an appropriate detector, such as a pressure sensor, and
- displace the drive member 25 vertically downward so that the reaction cuvette 4 is extracted out of the storage device 3.

Advantageously, in order to facilitate the breakage of the respective score lines during the lifting of a reaction cuvette to unload, the storage device 3 comprises a stop member 34 comprising a passage hole 35 intended to be disposed vertically above the lifted reaction cuvette. Thus, the storage device 3 is configured such that, during the lifting of a reaction cuvette 4 by the displacement device 22, the stop member 34 holds in position the reaction cuvettes 4 surrounding the lifted reaction cuvette and the passage hole 35 enables the passage of at least one portion of the lifted reaction cuvette. The presence of the upper chamfer 17 on each positioning rib 15 also facilitates the breakage of the score lines during the lifting of a reaction cuvette 4.

The automatic analysis system 1 further comprises an incubation device 36 mounted on the support tray 5. As shown more particularly in FIGS. 10 to 12, the incubation device 36 comprises a metallic part including a plurality of incubation cavities 37 disposed according to a matrix of rows and columns, and opening into a lower face of the incubation device 36. Each incubation cavity 37 is configured to receive and house, at least partially, one reaction cuvette 4. Each incubation cavity 37 comprises a lower introduction opening 38 which opens downward and is configured to enable the introduction of a reaction cuvette 4 into the respective incubation cavity. Advantageously, each incubation cavity 37 presents a shape substantially complementary to that of the reaction cuvettes 4.

According to the embodiment represented in the figures, each incubation cavity 37 comprises two retaining elements 39, such as retaining bosses or retaining protrusions, configured to cooperate with the longitudinal walls of a reaction cuvette 4 so as to retain the reaction cuvette 4 in the respective incubation cavity 37. Advantageously, each incubation cavity 37 is configured to completely house a reaction cuvette 4.

The incubation device 36 comprises an upper sealing portion 40 substantially planar and partially sealing the upper portions of the incubation cavities 37. Advantageously, the upper sealing portion 40 is provided with upper passage orifices 41 each opening into a respective incubation cavity 37, and each intended to the passage of a collection needle capable of piercing the sealing portions 21 of the reaction cuvettes 4 received in the incubation device 36 and to supply each reaction cuvette 4 received in the incubation device 36 with biological liquid samples to analyze and/or with reagent products. More particularly, each passage orifice 41 is disposed opposite to the introduction opening 38 of the respective incubation cavity 37.

The incubation device 36 further comprises an immobilization element 42, made for example in the form of an immobilization plate, including a plurality of passage openings 43. The immobilization element 42 is slidably mounted between an introduction position in which each passage opening 43 extends opposite a respective introduction opening 38 and reaction cuvettes 4 may be introduced into the incubation cavities 37, and an immobilization position in which each passage opening 43 is shifted laterally relative to the respective introduction opening 38 so as to prevent a removal of the reaction cuvettes 4 out of the respective incubation cavities 37.

Advantageously, the incubation device 36 is thermostated, and is more particularly configured to maintain the temperature of each reaction cuvette 4 received in an incubation cavity 37 within a predetermined range of temperatures. For example, the incubation device 36 may comprise one or several heating element(s) (not represented in the figures) configured to heat up the incubation cavities 37. Each heating element may be associated to one or several incubation cavities 37. These arrangements allow defining, where desired, different incubation temperatures in different areas of the incubation device 36.

It should be noted that the displacement device 22 is configured to load and unload one reaction cuvette 4 into and out of each incubation cavity 37 via the respective introduction opening 38, and to displace a reaction cuvette 4 between the storage device 3 and the incubation device 36. To this end, the support tray 5 also presents a passage aperture through which the incubation device 36 partially extends.

The automatic analysis system 1 also comprises one or several samples processing station(s) disposed on the support tray 5, such as analysis and/or measurement stations for in vitro diagnostics. Advantageously, one of these samples processing stations is a photometric reading station 44, which may for example comprise a photometric reading device 45 and an incubator 46.

According to the embodiment represented in the figures, the incubator 46 comprises (see FIGS. 13 to 15) an incubation rotor 47 with a substantially vertical axis of rotation and including a plurality of receiving cavities 48 shifted angularly relative to each other. Each receiving cavity 48 is configured to partially receive and house one reaction cuvette 4, and opens into a lower face of the incubation rotor 47. Each receiving cavity 48 comprises a lower introduction opening 49 which opens downward, and is configured to enable the introduction of a reaction cuvette 4 into the respective receiving cavity 48.

In addition, the incubation rotor 47 comprises a plurality of upper passage orifices 51 each opening into a respective receiving cavity 48, and each intended to the passage of a collection needle capable of supplying each reaction cuvette 4 received in the incubator 46 with biological liquid samples to analyze and/or with reagent products. More particularly, each passage orifice 51 is disposed opposite to the introduction opening 49 of the respective receiving cavity 48.

The incubator 46 also comprises rotational drive means associated to the incubation rotor 47, and arranged to drive the incubation rotor 47 in rotation about its axis of rotation. For example, the rotational drive means may comprise a drive motor 52.

The incubator 46 further comprises a fixed support portion 53 disposed under the incubation rotor 47. The fixed support portion 53 delimits a displacement track 54 in which reaction cuvettes 4, received in the receiving cavities 48 provided on the incubation rotor 47, can be displaced by the action of the incubation rotor 48. Advantageously, the displacement track 54 is annular and open at the top. The displacement track 54 is temperature-controlled, for example via means known to those skilled in the art, such as a heating element, a temperature sensor and a servo-control. For example, the heating element may consist of an electrical resistance.

The fixed support portion 53 further includes a lower loading opening 55 which opens into the displacement track 54 and through which a reaction cuvette 4 can be loaded into the incubator 46, and a lower unloading opening 56 which opens into the displacement track 54 and through which a reaction cuvette 4 can be unloaded out of the incubator 46. Advantageously, the lower unloading opening 56 is disposed above a wastes receptacle (not represented in the figures).

Advantageously, the photometric reading device 45 comprises a photometer 50 arranged to perform a photometric reading of the reaction cuvettes 4 received in the displacement track 54, and more particularly to measure the absorbance of the reactive solution in each reaction cuvette 4 received in the displacement track 54.

It should be noted that the displacement device 22 is configured to load and unload a reaction cuvette 4 into and out of each receiving cavity 48 via the respective introduction opening 49, and to displace a reaction cuvette 4 toward the photometric reading station 44. To this end, the support tray 5 also presents a passage aperture through which the incubator 46 partially extends.

According to a variant of the invention which is not represented in the figures, the incubator 46 may be fixed and comprise aligned receiving cavities 48, and the photometric reading device 45 may be movably mounted relative to the incubator 46 so as to perform a photometric reading of the reaction cuvettes 4 received in the receiving cavities of such an incubator.

The automatic analysis system 1 further comprises a washing and magnetic sedimentation station 57 mounted on the support tray 5. As shown in FIG. 57, the washing and magnetic sedimentation station 57 comprises a sedimentation portion 58 advantageously comprising a plurality of receiving cavities 59 aligned with respect to each other. Each receiving cavity 59 is configured to partially receive and house one reaction cuvette 4, and opens into a lower face of the sedimentation portion 58. Each receiving cavity 59 comprises a lower introduction opening 60 which opens downward, and is configured to enable the introduction of a reaction cuvette 4 into the respective receiving cavity 59.

It should be noted that the displacement device 22 is configured to load and unload a reaction cuvette 4 into and out of each receiving cavity 59 via the respective introduction opening, and to displace a reaction cuvette 4 toward the washing and magnetic sedimentation station 57, and for example to displace a reaction cuvette 4 from the incubation device 36 to the washing and magnetic sedimentation station 57.

The sedimentation portion 58 further comprises a plurality of magnetic field generators 61 each associated to one of the receiving cavities 59. Each magnetic field generator 61 is configured to generate a magnetic field, and may be formed for example by a permanent magnet or an electromagnet.

The washing and magnetic sedimentation station 57 further comprises a washing portion 62 comprising a plurality of pipetting apparatuses 63 each associated to one of the receiving cavities 59. Each pipetting apparatus 63 is configured to draw liquids contained in a reaction cuvette 4 received in the respective receiving cavity 59, and to introduce a washing solution into said reaction cuvette. Thus, when a reaction cuvette 4, containing magnetic particles coated with analyte binding partners, is received in one of the receiving cavities 59 of the washing and magnetic sedimentation station 57, the associated magnetic field generator 61 attracts the magnetic particles contained in said reaction cuvette 4 against one of the longitudinal walls of the latter, and the content of the reaction cuvette 4, with the exception of the magnetic particles and of the analyte, is sucked by the associated pipetting apparatus 63. Afterwards, a washing solution is introduced into the reaction cuvette 4 by the associated pipetting apparatus 63, in order to wash the magnetic particles. After a predetermined duration, the washing solution is sucked by the pipetting apparatus 63. As soon as the reaction cuvette 4 has been processed, it may be reintroduced into the incubation device 36 by means of the displacement device 22, or be introduced into an analysis and/or measurement station provided with a receiving cavity also by means of the displacement device 22.

Advantageously, the automatic analysis system 1 further comprises a luminescence reading station 64 mounted on the support tray 5 (see FIG. 1). The luminescence reading station 64 comprises a receiving portion 65 comprising a receiving cavity 66 similar to the receiving cavities 48, 59, and also arranged to receive and house, at least partially, one reaction cuvette 4. The luminescence reading station 64 further comprises a luminometer 67 configured to measure the light emitted by a solution contained in a reaction cuvette 4 received in the receiving portion 65, the light being produced by triggering reagents distributed directly within the reaction cuvette 4 received in the receiving portion 65, or distributed beforehand within the reaction cuvette 4 in an appropriate processing station.

The displacement device 22 is also configured to load and unload a reaction cuvette 4 into and out of the receiving cavity provided in the luminescence reading station 64, and to displace a reaction cuvette 4 toward the luminescence reading station 64, and for example to displace a reaction cuvette 4 from the washing and magnetic sedimentation station 57 to the luminescence reading station 64. After reading in the luminescence reading station 64, the reaction cuvette 4 may be ejected in the wastes receptacle.

The automatic analysis system 1 may further comprise a PCR amplification and measurement station 68 (see FIG. 1) mounted on the support tray 5. Advantageously, the PCR amplification and measurement station 68 comprises an incubator 69 including a plurality of receiving cavities 80 disposed in a matrix-like fashion and similar to the receiving cavities 48, 59 and to the incubation cavities 37, each receiving cavity of the PCR amplification and measurement station 68 being arranged to receive and house, at least partially, one reaction cuvette 4. The PCR amplification and measurement station 68 also comprises a fluorescence or luminescence reading device 70 which is advantageously multi-head and movably mounted in translation along the incubator 69. The incubator 69 may be thermostated at a constant temperature, or be equipped with a thermocycling system so as to vary the temperature of the respective receiving cavities.

The displacement device 22 is also configured to load and unload a reaction cuvette 4 into and out of each receiving cavity provided in the PCR amplification and measurement station 68, and to displace a reaction cuvette 4 toward the PCR amplification and measurement station 68, and for example to displace a reaction cuvette 4 from the washing and magnetic sedimentation station 57 to the PCR amplification and measurement station 68.

Advantageously, the storage device 3, the photometric reading station 44, the luminescence reading station 64, the washing and magnetic sedimentation station 57 and the PCR amplification and measurement station 68 are disposed around the incubation device 36.

The automatic analysis system 1 further comprises one or several collection device(s) 71 each equipped with a collection needle 72, and arranged to collect biological liquid samples to analyze and/or reagent products in containers 73 loaded into the automatic analysis system 1, and to supply the reaction cuvettes 4 with biological liquid samples and/or with reagent products, and for example to supply with biological liquid samples and/or with reagent products the reaction cuvettes 4 received in the incubation device 36, the incubator 46 and the incubator 69.

It should be noted that the automatic analysis system 1 may further include for example a cytometric measurement station and/or one or several coagulation measurement station(s).

The automatic analysis system 1 may further include one or several washing well(s) for washing the collection needle(s) 72. However, each collection needle 72 may be replaced by disposable endpieces in order to dispense with the use of washing wells.

Figure 17:
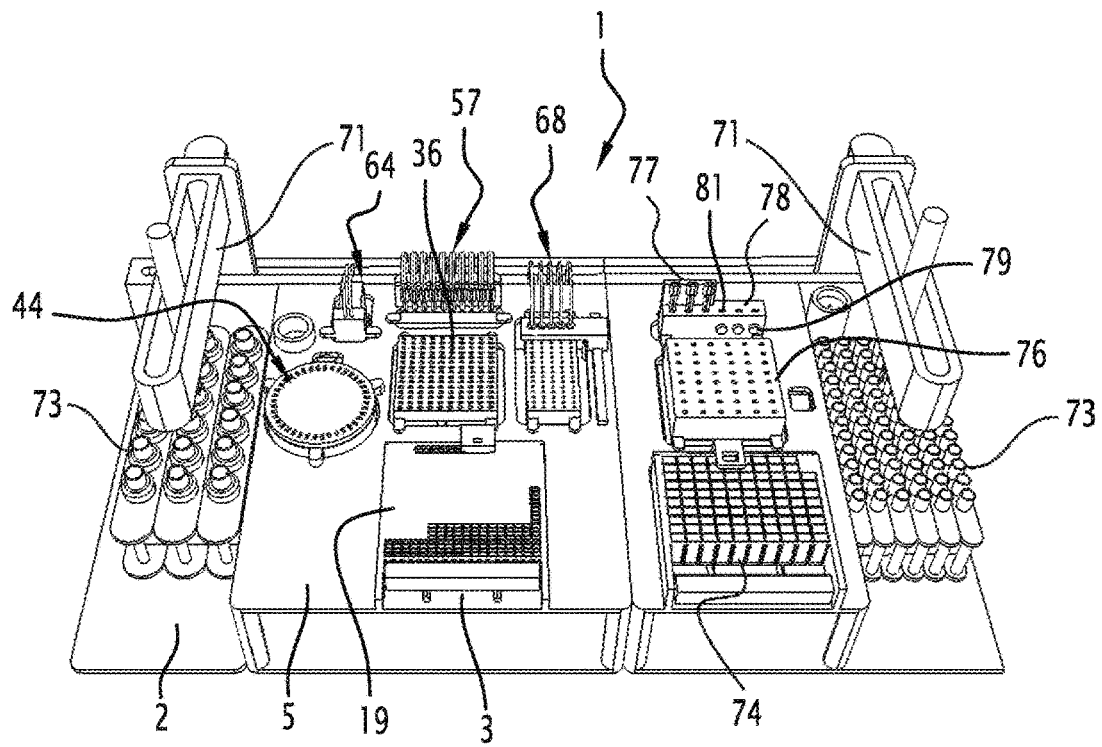
FIG. 17 is a perspective view of an automatic analysis system according to a second embodiment of the invention.
Figure 18:
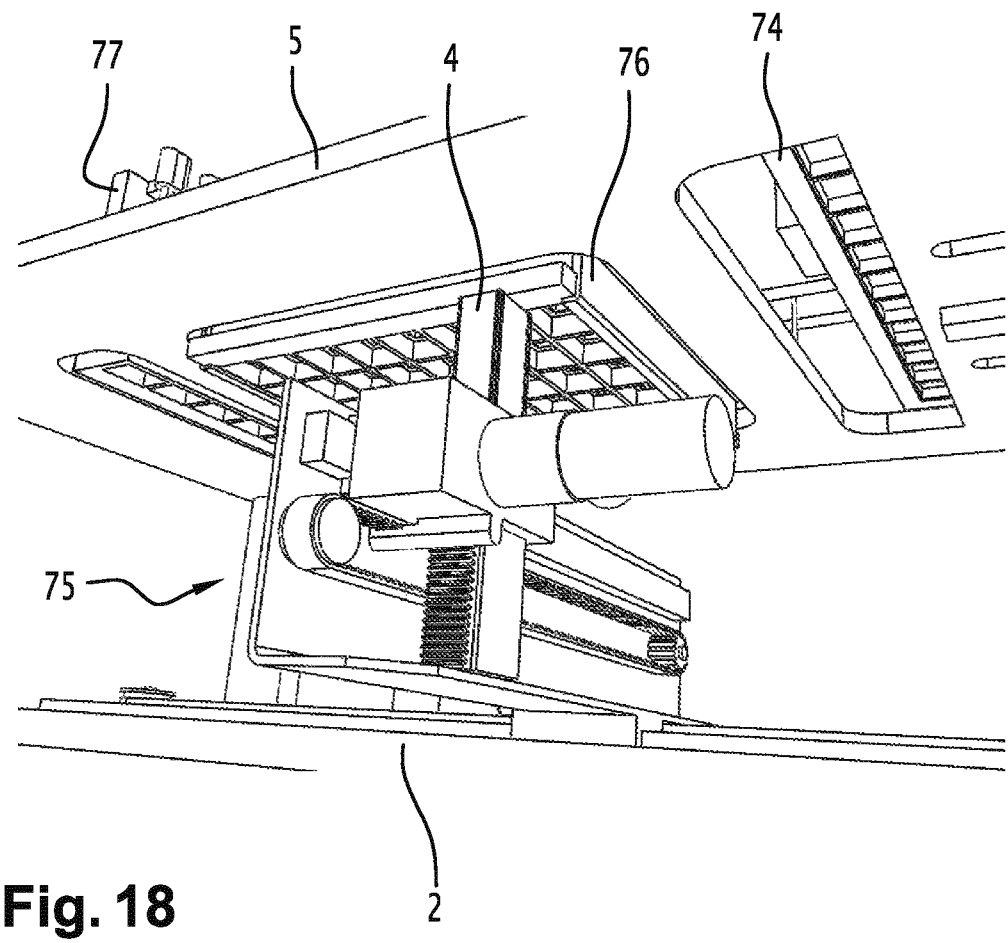
FIG. 18 is a bottom perspective view of a displacement device, of an incubation device and of different processing stations belonging to the automatic analysis system of FIG. 17.

FIG. 17 represents an automatic analysis system 1 according to a second embodiment of the invention which differs from the first embodiment essentially in that it includes a second storage device 74, a second displacement device 75, a second incubation device 76, a second washing and magnetic sedimentation station 77 and finally an elution station 78. It should be noted that the displacement device 75 is configured to unload a reaction cuvette 4 out of the storage device 74, and to load and unload a reaction cuvette 4 into and out of the incubation device 76, into and out of the washing and magnetic sedimentation station 77 and into and out of the elution station 78.

The storage device 74 differs from the storage device 3 essentially in that it is configured to receive reaction cuvettes 4 having larger size than those that may be stored in the storage device 3, and the incubation device 76 and the second washing and magnetic sedimentation station 77 differ respectively from the incubation device 36 and from the washing and magnetic sedimentation station 57 essentially in that they include incubation and receiving cavities having larger dimensions in order to allow receiving the reaction cuvettes 4 stored in the storage device 74. It should be noted on the one hand that the second displacement device 75 differs from the displacement device 22 only in that the associated drive member presents dimensions adapted to the reaction cuvettes 4 intended to be stored in the storage device 73, and on the other hand that the reaction cuvettes intended to be stored in the storage device 73 present a structure identical or substantially identical to those intended to be stored in the storage device 3.

For example, the reaction cuvettes 4 intended to be stored in the storage device 3 present a reaction cavity 8 with a volume of about 200 μL, whereas the reaction cuvettes 4 intended to be stored in the storage device 73 present a reaction cavity 8 with a volume of about 2 mL. For example, a reaction cuvette 4 stored in the storage device 73 will be used to carry out extraction pre-treatments or extractions on significant volumes of liquid, whereas a reaction cuvette 4 stored in the storage device 3 may be used in the other cases in order to limit the used amount of reagent products. It may also be possible to carry out the extraction pre-treatment in a reaction cuvette 4 originating from the storage device 73, and afterwards the corresponding measurement in a reaction cuvette 4 originating from the storage device 3.

The elution station 78 comprises a plurality of receiving cavities aligned with respect to each other and similar to the receiving cavities of the washing and magnetic sedimentation station 77. The elution station 78 further comprises a plurality of magnetic field generators 79 each associated to a respective receiving cavity of the elution station 78. Each magnetic field generator 79 is configured to generate a magnetic field, and may be formed for example by a permanent magnet or an electromagnet.

The elution station 78 further comprises a plurality of upper passage orifices 81 each opening into a respective receiving cavity of the elution station 78, and each intended to the passage of a collection needle capable of supplying each reaction cuvette 4 received in the elution station 78 with an elution solution, such as the collection needle 72 of one of the collection devices 71. According to a variant of the invention, the elution station 78 may be provided with a plurality of pipetting apparatuses each associated to one of the receiving cavities of the elution station 78, and each configured to introduce an elution solution into a reaction cuvette 4 received in the respective receiving cavity.

Thus, when a reaction cuvette 4, containing magnetic particles which are coated with analyte binding partners and which have been washed beforehand in the washing and magnetic sedimentation station 77, is received in one of the receiving cavities of the elution station 78, an elution solution is introduced into the reaction cuvette 4, by one of the collection devices 71 or by the associated pipetting apparatus, so as to separate the analyte and the magnetic particles. Afterwards, the associated magnetic field generator 79 attracts the magnetic particles contained in the reaction cuvette 4 against one of the longitudinal walls of the latter, and the content of the reaction cuvette 4, with the exception of the magnetic particles, is sucked out of the reaction cuvette 4, for example by one of the collection devices 71 or by the associated pipetting apparatus, and is introduced into another reaction cuvette, for example stored in the PCR amplification and measurement station 68, for a subsequent optical measurement.

According to a variant of the invention, the incubator 69 of the PCR amplification and measurement station 68 may be similar to the incubator 46, and thus include an incubation rotor, and a fixed support portion disposed under the respective incubation rotor and delimiting an annular and thermocycled displacement track.

It goes without saying that the invention is not limited to the sole embodiments of this automatic analysis system, described hereinabove as examples, but it comprises on the contrary all variants thereof.

The invention claimed is:

1. An automatic analysis system for in vitro diagnostics, comprising:
    a plurality of reaction cuvettes being disposed in a matrix of rows and columns, each reaction cuvette comprising a base and being configured to contain a biological liquid sample to analyze, the plurality of reaction cuvettes being connected to each other by a flexible sealing film so as to form a reaction cuvettes arrangement, the flexible sealing film sealing openings of the plurality of reaction cuvettes,
    a storage device configured to store the plurality of reaction cuvettes,
    an analysis and/or measurement station configured to carry out blood tests, the analysis and/or measurement station comprising at least one receiving cavity configured to receive and house at least partially one reaction cuvette of the plurality of reaction cuvettes, the at least one receiving cavity comprising a lower introduction opening which opens downward, and
    a displacement device disposed under the analysis and/or measurement station, the displacement device being further configured to unload a reaction cuvette out of the storage device, to displace the reaction cuvette with respect to the storage device such that the reaction cuvette remains sealed but the film is broken away from the reaction cuvettes arrangement, and to load and unload the reaction cuvette into and out of the at least one receiving cavity of the analysis and/or measurement station via the respective lower introduction opening,
    the displacement device comprising:
    a first support element being displaceable below the storage device and according to a first direction of displacement which is substantially horizontal,
    a second support element mounted on the first support element and supported by the first support element, the second support element being displaceable below the storage device and being displaceable with respect to the first support element according to a second direction of displacement which is substantially horizontal and which is substantially orthogonal to the first direction of displacement, and
    a drive member mounted on the second support element and supported by the second support element, the drive member being displaceable with respect to the second support element according to a third direction of displacement which is substantially vertical, the drive member being configured to cooperate with the base of a reaction cuvette and to transmit a drive movement to said reaction cuvette.

2. The automatic analysis system according to claim 1, wherein the displacement device comprises first translational drive means configured to drive the first support element in translation according to the first direction of displacement, second translational drive means configured to drive the second support element in translation according to the second direction of displacement, and third translational drive means configured to drive the drive member in translation according to the third direction of displacement.

3. The automatic analysis system according to claim 1, wherein the base of each reaction cuvette comprises a receiving housing opening downward, the drive member being configured to be received at least partially in the receiving housing of a reaction cuvette.

4. The automatic analysis system according to claim 1, wherein the displacement device comprises suction means configured to retain a reaction cuvette on the drive member during the displacement of said reaction cuvette.

5. The automatic analysis system according to claim 1, wherein each receiving cavity comprises at least one retaining protrusion configured to cooperate with a longitudinal wall of a reaction cuvette received in said receiving cavity so as to removably retain said reaction cuvette in said receiving cavity.

6. The automatic analysis system according to claim 1, wherein the flexible sealing film comprises a plurality of score lines delimiting a plurality of sealing portions, each sealing portion sealing an opening of a respective reaction cuvette.

7. The automatic analysis system according to claim 6, wherein the drive member of the displacement device is configured to lift up a reaction cuvette stored in the storage device so as to break up the score lines delimiting the respective sealing portion.

8. The automatic analysis system according to claim 7, wherein the storage device comprises a stop member comprising a passage hole, the storage device being configured such that, during the lifting of a reaction cuvette stored in the storage device by the drive member of the displacement device, the stop member holds in position the plurality of reaction cuvettes adjacent to the reaction cuvette lifted by the drive member and the passage hole enables the passage of at least one portion of the reaction cuvette lifted by the drive member.

9. The automatic analysis system according to claim 1, wherein each reaction cuvette comprises, on each of its lateral walls, at least one positioning rib configured to cooperate with an adjacent reaction cuvette, so as to form at least one space between the openings of two adjacent reaction cuvettes.

10. The automatic analysis system according to claim 1, which further comprises an incubation device comprising a plurality of incubation cavities each configured to receive and house at least partially one reaction cuvette, the incubation device being configured to heat up the incubation cavities, each incubation cavity comprising a lower introduction opening which opens downward and which is configured to enable an introduction of a reaction cuvette into the respective incubation cavity, the displacement device being configured to load and unload a reaction cuvette into and out of each incubation cavity via the respective introduction opening.

11. The automatic analysis system according to claim 10, wherein the incubation device comprises a plurality of upper passage orifices each opening into a respective incubation cavity, each upper passage orifice being intended for the passage of a collection needle capable of supplying each reaction cuvette received in the incubation device with biological liquid samples to analyze and/or with reagent products.

12. The automatic analysis system according to claim 10, wherein the incubation device comprises an immobilization plate movably mounted between an introduction position in which reaction cuvettes can be loaded and unloaded into and out of the incubation cavities, and an immobilization position in which the immobilization plate prevents a removal of the reaction cuvettes out of the respective incubation cavities.

13. The automatic analysis system according to claim 1, wherein the analysis and/or measurement station includes at least one device among a photometric reading device, a fluorescence reading device, a luminescence reading device, a cytometric measurement device and a coagulation measurement device.

14. The automatic analysis system according to claim 1, wherein the least one receiving cavity includes a plurality of receiving cavities, and the analysis and/or measurement station includes a photometric reading station comprising a photometric reading device and an incubator including the plurality of receiving cavities each configured to receive and house at least partially one reaction cuvette, the incubator being configured to heat up the plurality of receiving cavities, the photometric reading device being capable of performing a photometric reading of a reaction cuvettes received in the plurality of receiving cavities of the incubator.

15. The automatic analysis system according to claim 14, wherein the incubator comprises:
   an incubation rotor with a substantially vertical axis of rotation and including the plurality of receiving cavities,
   a fixed support portion disposed under the incubation rotor, the fixed support portion delimiting a displacement track in which reaction cuvettes, received in the plurality of receiving cavities provided on the incubation rotor, can be displaced by the action of the incubation rotor, the displacement track being annular and open at the top.

16. The automatic analysis system according to claim 10, wherein the incubation device is configured to maintain a temperature of a reaction cuvette received in each incubation cavity within a predetermined range of temperatures.

* * * * *